(12) United States Patent
Park et al.

(10) Patent No.: US 8,509,434 B2
(45) Date of Patent: Aug. 13, 2013

(54) METHOD AND APPARATUS FOR PROTECTING SCALABLE VIDEO CODING CONTENTS

(75) Inventors: Keun Soo Park, Seoul (KR); Keun Sik Lee, Seoul (KR); Sang Jin Hahm, Seoul (KR); Byung Sun Kim, Gyeonggi-do (KR); Mun Churl Kim, Daejeon (KR)

(73) Assignees: Korean Broadcasting System, Seoul (KR); Korea Advanced Institute of Science and Technology, Daejeon (KR)

( * ) Notice: Subject to any disclaimer, the term of this patent is extended or adjusted under 35 U.S.C. 154(b) by 1333 days.

(21) Appl. No.: 12/142,934

(22) Filed: Jun. 20, 2008

(65) Prior Publication Data

US 2010/0014666 A1     Jan. 21, 2010

(51) Int. Cl.
*H04N 7/167* (2011.01)

(52) U.S. Cl.
USPC ............ 380/210; 370/240; 380/200; 380/201

(58) Field of Classification Search
USPC ...... 380/200–202, 210; 375/240; 726/26–32
See application file for complete search history.

(56) References Cited

U.S. PATENT DOCUMENTS

| 7,356,148 | B2* | 4/2008 | Hayashi | 380/281 |
| 2002/0094089 | A1* | 7/2002 | Kamiya et al. | 380/279 |
| 2002/0163911 | A1* | 11/2002 | Wee et al. | 370/389 |
| 2003/0012376 | A1* | 1/2003 | Wee et al. | 380/200 |
| 2003/0185399 | A1* | 10/2003 | Ishiguro | 380/281 |
| 2004/0196972 | A1* | 10/2004 | Zhu et al. | 380/45 |
| 2007/0086516 | A1* | 4/2007 | Lee et al. | 375/240.1 |
| 2007/0116277 | A1* | 5/2007 | Ro et al. | 380/201 |
| 2008/0037783 | A1* | 2/2008 | Kim et al. | 380/241 |

* cited by examiner

*Primary Examiner* — Nirav B Patel
(74) *Attorney, Agent, or Firm* — The Webb Law Firm (57) ABSTRACT

Disclosed are a method and apparatus capable of reducing the computational complexity of encryption and decryption by encrypting only data of scalable video coding contents for each coding layer in terms of temporal, spatial, and SNR scalabilities to provide a service for protected scalable video coding contents, and capable of protecting contents by generating and distributing an encryption key for encryption and decryption depending on a class of a contents consumer.

22 Claims, 9 Drawing Sheets

METHOD AND APPARATUS FOR PROTECTING SCALABLE VIDEO CODING CONTENTS

BACKGROUND OF THE INVENTION

1. Field of the Invention

The present invention relates to a method and apparatus for protecting scalable video coding contents, and more particularly, to a method and apparatus capable of reducing the computational complexity of encryption and decryption by encrypting only data of scalable video coding contents for each coding layer in terms of temporal, spatial, and Signal-to-Noise Ratio (SNR) scalabilities, to provide a service for protected scalable video coding contents, the method and apparatus also capable of protecting contents by generating and distributing an encryption key for encryption and decryption depending on a class of a contents consumer.

2. Discussion of Related Art

As is known, a conventional compressed video content protection scheme involves packetizing video contents and encrypting the resultant packets upon transmission to protect the contents, or encrypting stored, compressed video contents to protect them.

However, the protection scheme has a disadvantage of high computational complexity in decrypting encrypted compressed video contents. Also, the scheme encrypts all data of respective layers in scalable video coding contents, increasing inefficient computational complexity.

SUMMARY OF THE INVENTION

The present invention is directed to a method and apparatus for protecting scalable video coding contents that are capable of reducing the computational complexity of encryption and decryption by encrypting only data of scalable video coding contents for each coding layer in terms of temporal, spatial, and SNR scalabilities to provide a service for protected scalable video coding contents, and capable of protecting contents by generating and distributing an encryption key for encryption and decryption depending on a class of a contents consumer.

An aspect of the present invention provides a method for protecting scalable video contents in a scalable video coding contents providing system that encrypts and provides scalable video contents requested by a scalable video user terminal, the method including: receiving the requested scalable video contents; storing the received scalable video contents in a scalable video contents archive and controlling to perform authentication and generate an encryption key to be sent to the user; performing the authentication and generating the encryption key; imaging a scalable video in response to the request and coding the imaged scalable video contents; encrypting the coded scalable video contents using the generated encryption key; generating encryption information metadata for the encrypted scalable video coding contents; and transmitting the encrypted scalable video coding contents and the generated encryption information metadata to the scalable video user terminal via a network or a storage medium.

Another aspect of the present invention provides a method for protecting scalable video coding contents in a scalable video user terminal that decrypts and decodes encrypted scalable video coding contents and encryption information metadata received from a scalable video coding contents providing system, the method including: parsing the received encryption information metadata to obtain an encryption key and encryption information; decrypting the received encrypted scalable video coding contents using the encryption key and the encryption information; and decoding and reproducing the decrypted scalable video contents.

Still another aspect of the present invention provides scalable video coding contents providing system for protecting scalable video contents requested by a scalable video user terminal, the system including: a user contents request information receiving unit for receiving the requested scalable video contents; a scalable video contents service control unit for storing the received scalable video contents in a scalable video contents archive and controlling to perform authentication and generate an encryption key to be sent to the user; a user authenticating and encryption key control unit for performing the authentication and generating the encryption key; an imaging unit for imaging a scalable video in response to the request; a scalable video coding unit for coding the imaged scalable video contents; a scalable video coding data encryption unit for encrypting the coded scalable video contents using the generated encryption key; an encryption information metadata generation unit for generating encryption information metadata for the encrypted scalable video coding contents; and encrypted scalable video coding contents and encryption information metadata transmission unit for transmitting the encrypted scalable video coding contents and the generated encryption information metadata to the scalable video user terminal via a network.

Yet another aspect of the present invention provides a scalable video user terminal for protecting encrypted scalable video coding contents and encryption information metadata by decrypting and decoding the same, the terminal including: an encrypted scalable video metadata parsing unit for parsing received encryption information metadata to obtain an encryption key and encryption information; a scalable encrypted video decryption unit for decrypting the received encrypted scalable video coding contents using the encryption key and encryption information; a scalable video decoding unit for decoding the decrypted scalable video contents; and a scalable decoded video rendering unit for rendering and reproducing the decoded scalable video contents.

Yet another aspect of the present invention provides an apparatus for protecting scalable video coding contents, the apparatus including: an input unit for dividing and inputting input video data acquired in response to a request from a video user terminal into at least one of temporal, spatial, and SNR scalability layers; a coding unit for coding the input video data of at least one of the temporal, spatial, and SNR scalability layers; an encryption unit for encrypting video data of the coded temporal, spatial, and SNR scalability layers; a generation unit for generating metadata for the video data of the encrypted temporal, spatial, and SNR scalability layers; and a storage unit for combining and storing the encrypted coding data of the temporal, spatial, and SNR scalability layers and the generated metadata.

Yet another aspect of the present invention provides a method for protecting scalable video coding contents, the method including: dividing and inputting input video data acquired in response to a request from a video user terminal into at least one of temporal, spatial, and SNR scalability layers; coding the input video data of the at least one of the temporal, spatial, and SNR scalability layers; encrypting the video data of the coded temporal, spatial, and SNR scalability layers; generating metadata for the video data of the encrypted temporal, spatial, and SNR scalability layers; and combining and storing the encrypted coding data of the temporal, spatial, and SNR scalability layers and the generated metadata.

Yet another aspect of the present invention provides a method for protecting scalable video coding contents, the method including: dividing input video data into at least one of temporal, spatial, and SNR scalability layers; coding the input video data of the at least one of the temporal, spatial, and SNR scalability layers; grouping bit-streams for the input video data of the coded temporal, spatial, and SNR scalability layers as a combination of the at least one temporal, spatial, and SNR scalability layers to form tiers; encrypting one or more of the formed tiers; and generating encryption information for the encrypted tiers as metadata. Meanwhile, the input video data may be input as one or more layers rather than three scalability layers.

The method may further include combining the encrypted tiers or original tiers and the metadata for tier protection and storing the result as one file or as separate data. Meanwhile, the encrypting of one or more of the formed tiers may include either protecting all the tiers or selectively encrypting bit-stream data corresponding to a specified scalability combination in the tier.

Yet another aspect of the present invention provides a computer-readable recording medium having a program stored therein for executing a method for protecting scalable video coding contents. That is, the method for protecting scalable video coding contents according to the present invention may be implemented by a computer code in a computer-readable recording medium. The computer-readable recording medium includes any type of recording device for storing data that can be read by a computer system.

For example, examples of the computer-readable recording medium include a read-only memory (ROM), a random access memory (RAM), a compact disk read-only memory (CD-ROM), a magnetic tape, a hard disk, a floppy disk, a movable storage device, a nonvolatile memory (e.g., flash memory), and an optical data storage device. The recording medium may also be implemented by a transmission medium, such as carrier waves (e.g., Internet-based transmission).

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which.

DETAILED DESCRIPTION OF EXEMPLARY EMBODIMENTS

Hereinafter, exemplary embodiments of the present invention will be described in detail. The present invention is not limited to the embodiments disclosed below, but can be implemented in various forms. The following embodiments are described to enable those of ordinary skill in the art to embody and practice the invention.

Figure 1A:
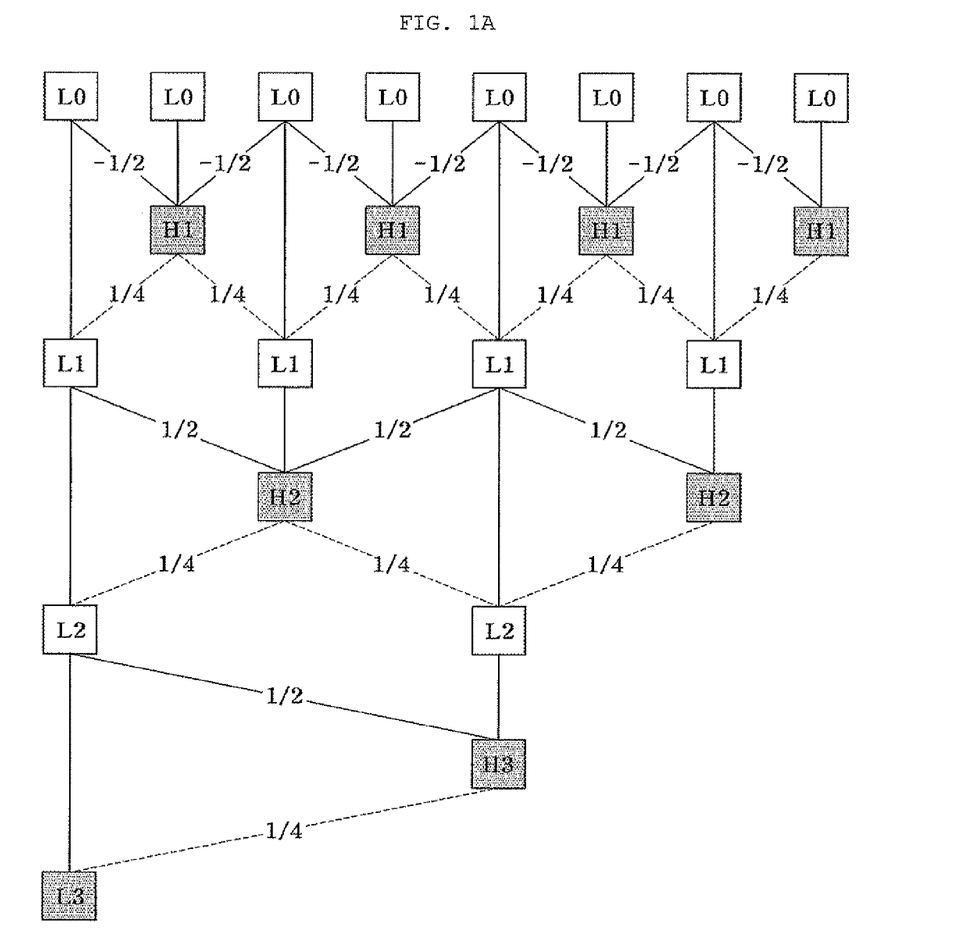
FIG. 1 illustrates temporally disassembled and assembled scalable video frames according to the present invention.
Figure 1B:
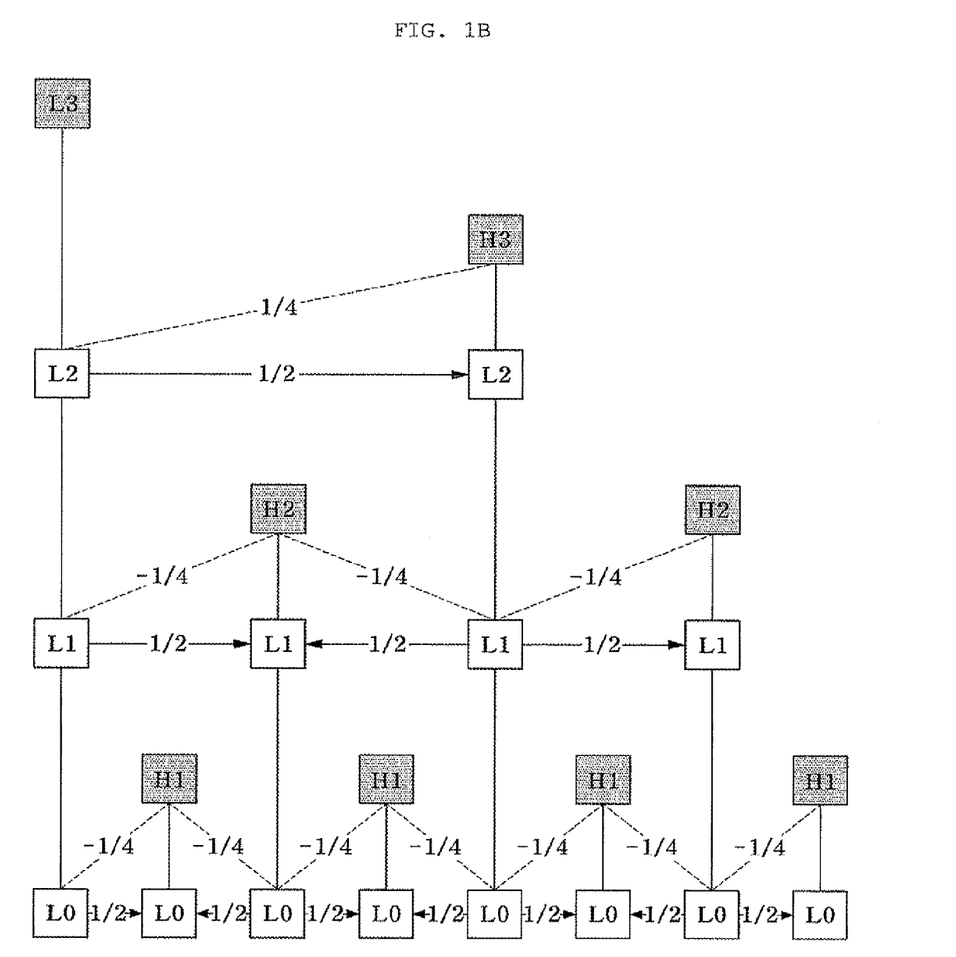

FIGS. 1a and 1b illustrate temporally disassembled and assembled scalable video frames according to the present invention. FIG. 1a illustrates a temporally disassembled scalable video frame and FIG. 1b illustrates a temporally assembled scalable video frame.

First, referring to FIG. 1a, successive video frames are divided into respective frame (picture) groups. In each picture group, a low-pass filtered picture and a high-pass filtered picture each having a ½ temporal resolution form one layer through temporal filtering. The layer is divided into a low-pass filtered picture and a high-pass filtered picture each having a ½ temporal resolution on a lower layer. In other words, the temporal disassembly process is continued until only one low-pass filtered picture remains on the lowest layer.

Next, referring to FIG. 1b, a process of temporally assembling scalable video frames is the reverse of the disassembly process, and includes obtaining a low-pass filtered picture on the same layer from the low-pass filtered picture of the lowest layer obtained in the disassembly process, using a high-pass filtered picture of a next upper layer. This process is performed until resolution of an original image is obtained.

In other words, when the temporally disassembled scalable video contents are transmitted, the low-pass filtered picture of the lowest layer is first transmitted and then high-pass filtered pictures of next upper layers are transmitted in sequence. Here, the low-pass filtered pictures of all upper layers can be protected by encrypting only the lowest low-pass filtered picture for scalable video protection. Encryption of high-pass filtered pictures of the upper layer according to an allowed temporal resolution can allow temporal resolution of only pictures of lower layers.

Figure 2:
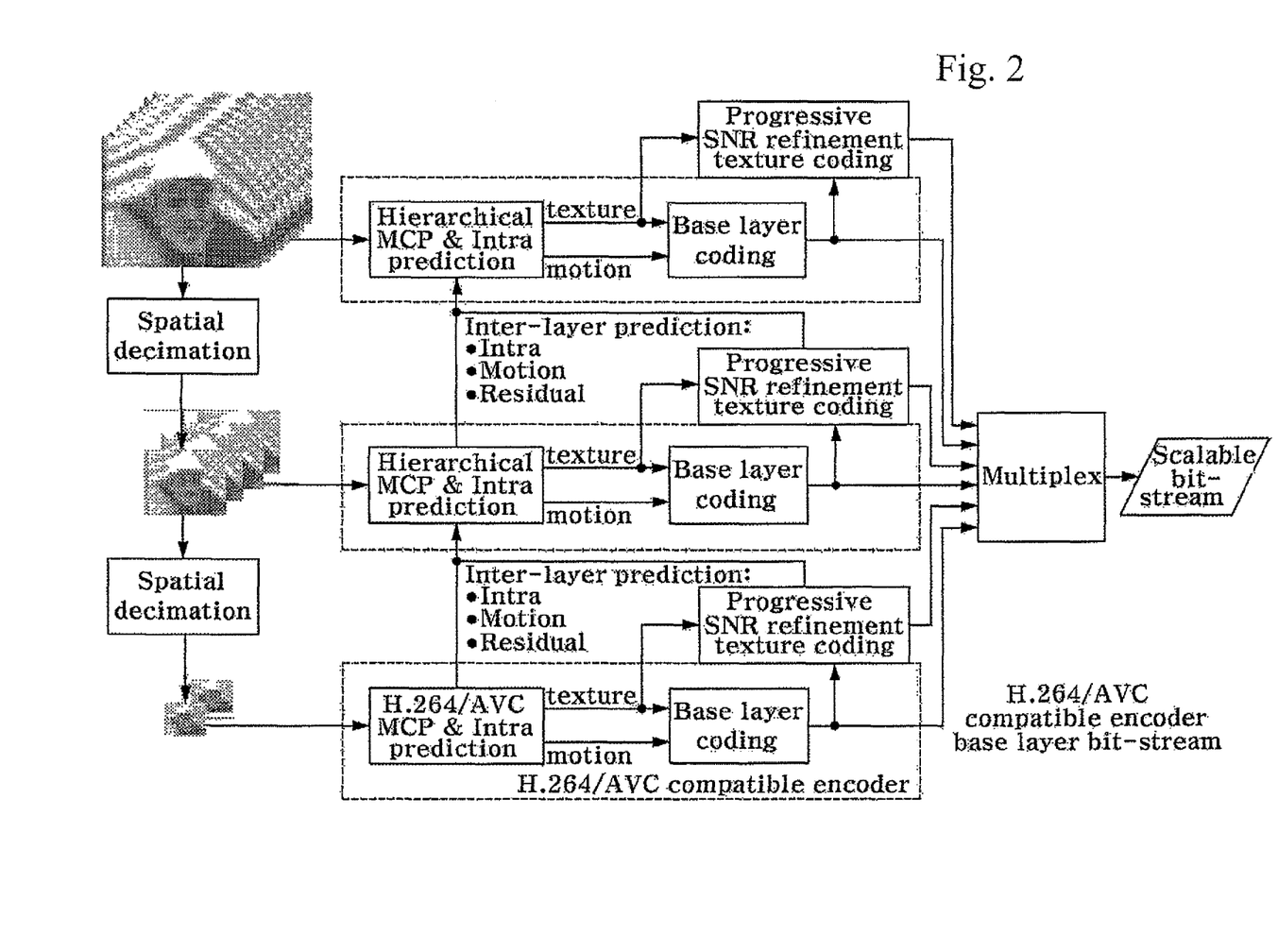
FIG. 2 illustrates an MPEG-4 scalable video coding (AVC) block.

FIG. 2 illustrates an MPEG-4 scalable video coding (AVC) block. Spatial resolution of original image pictures is reduced through down sampling or filtering, and the pictures having the reduced spatial resolution are input to a coding block for a corresponding layer. The lowest layer in which pictures having the smallest spatial resolution are coded is coded by an MPEG-4 AVC or H.264 video coding scheme, and input pictures on each upper layer are coded using motion vectors, texture, a residual signal, and the like, used for coding the lower layer. The coding structure is called coarse granular scalability. Meanwhile, each coding layer may be coded by fine granular scalability capable of performing coding with image quality divided into sub-classes.

Figure 3:
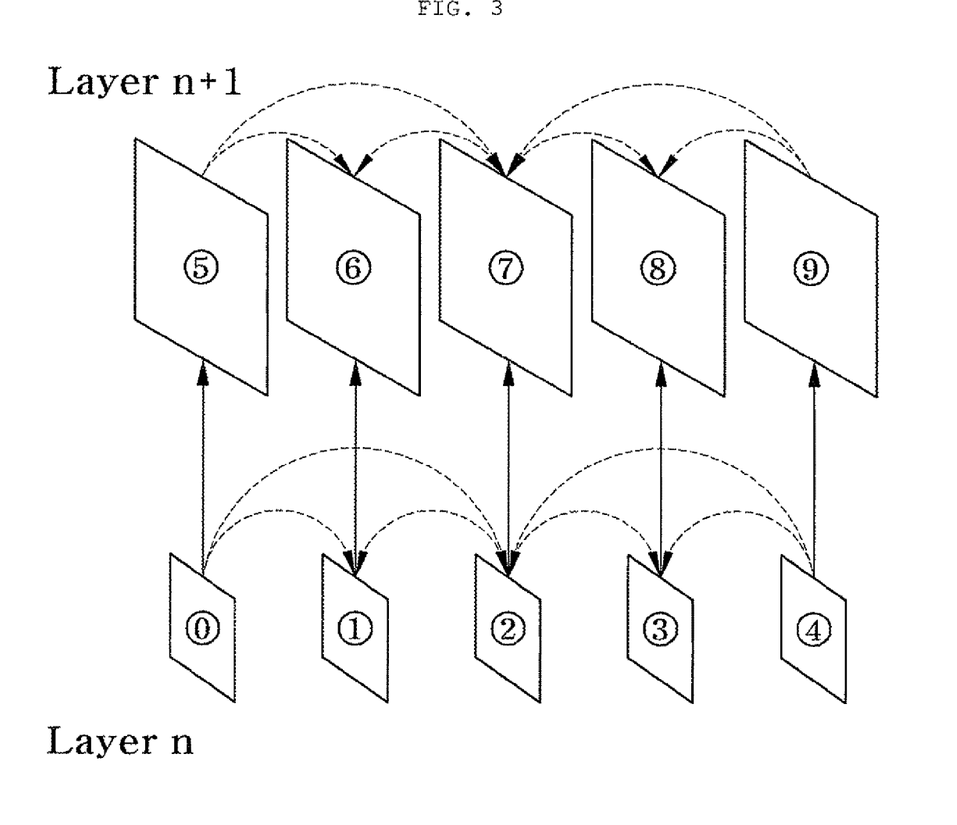
FIG. 3 illustrates a temporal/spatial scalability structure for scalable video coding contents protection according to the present invention.

FIG. 3 illustrates a temporal/spatial scalability structure for scalable video coding contents protection according to the present invention.

Referring to FIG. 3, ⓪ to ④ denote pictures of a lower layer n, and ⑤ to ⑨ denote pictures of an upper layer n+1. Here, the pictures of the lower layer n are coded through temporal disassembly and the pictures of the upper layer n+1 are coded with the same temporal disassembly structure as the pictures of the lower layer n. Upon coding, the pictures of the upper layer n+1 are coded using motion vectors, texture, a residual signal, and the like, from the corresponding pictures of the lower layer n.

For example, picture ⑦ of the upper layer n+1 is coded using motion vectors, texture, a residual signal, and the like, used upon coding picture ② of the lower layer n, and using pictures ⑤ and ⑨. Accordingly, when pictures ⓪ and ④ are encrypted for scalable video contents protection, all of pictures ①, ②, and ③ and pictures ⑤ to ⑨ cannot be reproduced without decrypting pictures ⓪ and ④. This is very effective for scalable video contents protection.

Figure 4:
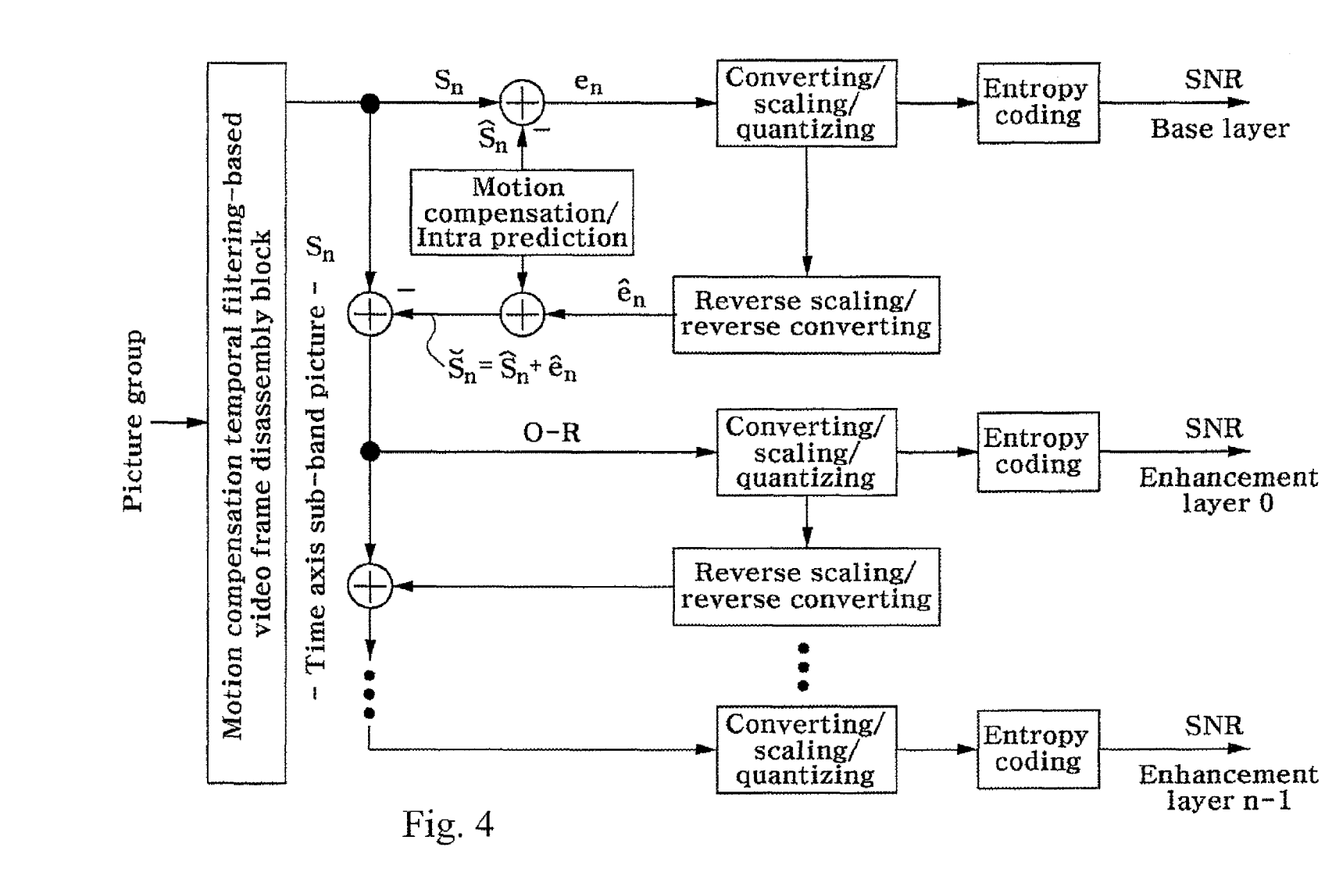
FIG. 4 illustrates a Fine Granular Scalability (FGS) block of an apparatus for protecting MPEG-4 scalable video coding contents according to the present invention.

FIG. 4 illustrates a Fine Granular Scalability (FGS) block in an apparatus for protecting MPEG-4 scalable video coding contents according to the present invention.

A base layer of the FGS codes an input image through a converting, scaling, and quantizing process, and decodes the coded image through a reverse process to obtain a residual signal with the original image. An enhancement layer of the FGS receives the residual signal from the base layer of the FGS, performs a converting and scaling process and a finer quantization than that of the base layer of the FGS on the residual signal, and entropy-codes the result.

Meanwhile, a further residual signal is obtained from the image decoded by the enhancement layer and the image decoded by the base layer. The result is used only as an input of a next enhancement layer. This process is continuously performed on a desired FGS layer. In terms of FGS content protection, when the residual signal obtained by the lower layer is encrypted, a decoding process cannot be correctly performed in the next enhancement layers without decrypting the residual signal.

The scalable video coding contents protection considering all of the temporal, spatial, and SNR scalabilities in FIGS. 1, 2, 3 and 4 will be described with reference to FIG. 1a.

In FIG. 1a, a low-pass filtered picture $L_3$ on the lowest layer of the base layer is the most basic picture. When the picture $L_3$ has been encrypted, one entire group of pictures (GoP) cannot be reproduced without successively decrypting the picture $L_3$. Since the group of pictures of the base layer cannot be all decoded, pictures of upper layers cannot be all decoded as well.

When, on the base layer, the $L_3$ picture is not encrypted and other $H_3$ high-pass filtered pictures are encrypted, only the L3 picture in one group of pictures can be decoded. Accordingly, the picture $L_3$ of the lowest layer even in an enhancement layer corresponding to the picture of the lowest layer $L_3$ of the base layer can be decoded. When corresponding pictures $L_3$ of the enhancement layers are to be protected while permitting decoding of only the picture $L_3$ of the base layer, only the $L_3$ picture coding data of the enhancement layer is protected, such that pictures $L_3$ of upper enhancement layers cannot be decoded without performing decryption.

Similarly, protection of only pictures above the picture $L_2$ needs only encrypt a high-pass filtered picture $H_2$, and protection of only pictures above the picture $L_1$ needs only encrypt high-pass filtered pictures $H_2$.

A low-pass filtered picture $L_3$ and high-pass filtered pictures $H_3$, $H_2$ and $H_1$ on the temporal resolution layer of the base layer are encrypted using a different encryption key, and disclosure of the encryption key is limited depending on different user groups and business models, which allows the user group to consume the same scalable video contents in a different scalability level.

Figure 5:
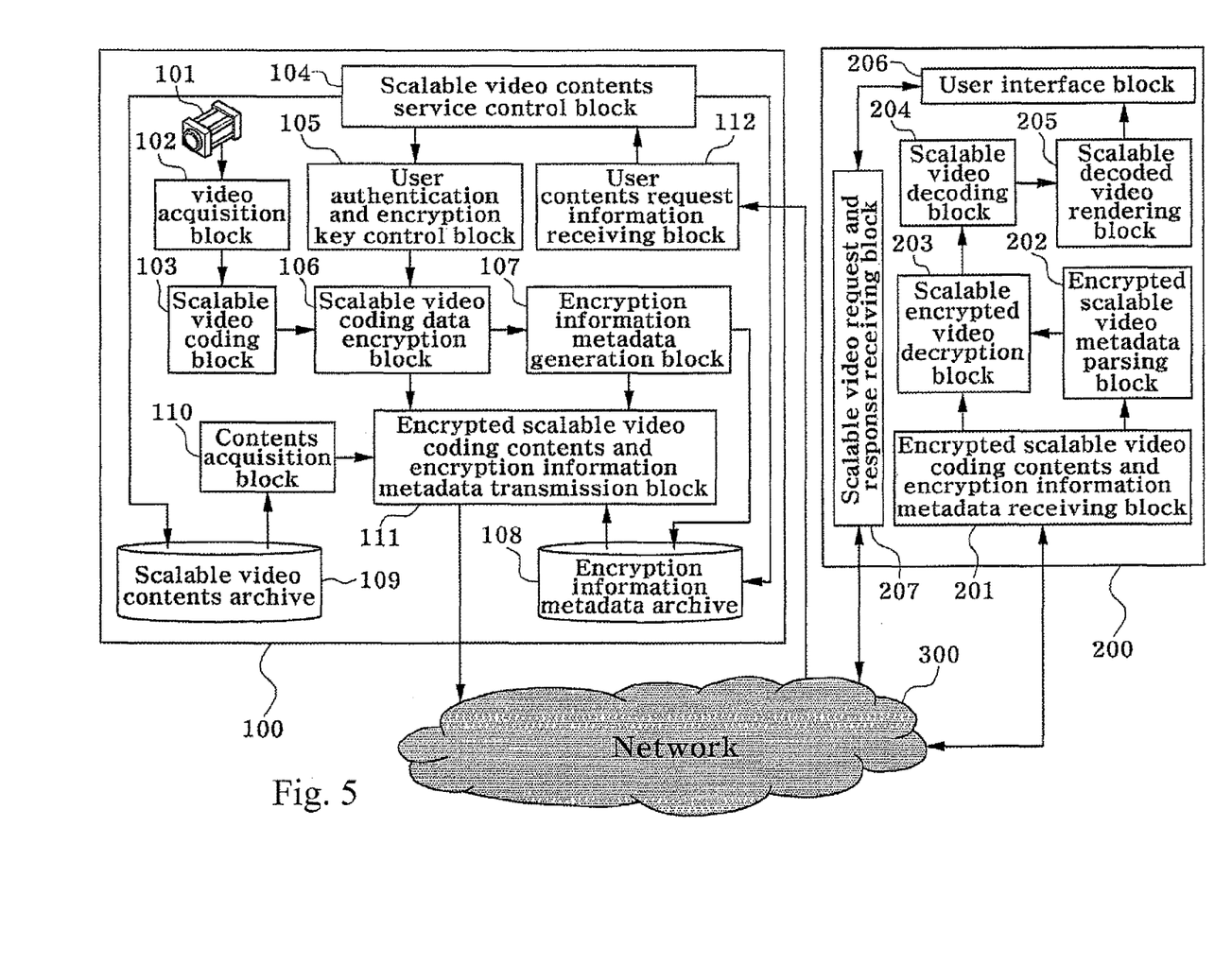
FIG. 5 is a block diagram illustrating an apparatus for protecting scalable video coding contents according to the present invention.

FIG. 5 is a block diagram of an apparatus for protecting scalable video coding contents according to the present invention.

A scalable video coding contents providing system 100 includes a camera 101 as a video acquiring apparatus, a video acquisition block 102, a scalable video coding block 103, a scalable video contents service control block 104, a user authentication and encryption-key control block 105, a scalable video coding data encryption block 106, an encryption information metadata generation block 107, an encryption information metadata archive 108, a scalable video contents archive 109, a contents acquisition block 110, an encrypted scalable video coding contents and encryption information metadata transmission block 111, and a user contents request information receiving block 112.

A scalable video user terminal 200 may be a wired terminal (e.g., a computer having a network access unit) or a wireless terminal (e.g., a cellular phone, a Personal Communication System (PCS), a Personal Digital Assistant (PDA), an IMT-2000, a PDA phone, or a smart phone). The scalable video user terminal 200 includes an encrypted scalable video coding contents and encryption information metadata receiving block 201, an encrypted scalable video metadata parsing block 202, a scalable encrypted video decryption block 203, a scalable video decoding block 204, a scalable decoded video rendering block 205, a user interface block 206, and a scalable video request and response receiving block 207.

Operation of the apparatus for protecting scalable video coding contents according to the present invention will be described in greater detail.

Referring to FIG. 5, the user interface block 206 in the scalable video user terminal 200 requests scalable video contents from the scalable video coding contents providing system 100 via a network 300.

The scalable video coding contents providing system 100 receives the scalable video contents requested by the user via the user contents request information receiving block 112 and inputs the same to the scalable video contents service control block 104.

The scalable video contents service control block 104 receives the scalable video contents, stores the scalable video contents in the scalable video contents archive 109, controls the user authentication and encryption key control block 105 to perform authentication and generate an encryption key to be provided to the user.

In this case, the camera 101 images a video to generate the requested scalable video contents under control of the scalable video contents service control block 104. The video acquisition block 102 acquires the generated scalable video contents and provides the same to the scalable video coding block 103.

The scalable video coding block 103 codes the provided scalable video contents and provides the same to the scalable video coding data encryption block 106.

The scalable video coding data encryption block 106 performs user authentication on the coded scalable video contents, encrypts the content using the encryption key from the encryption key control block 105, and provides the encrypted content to the encrypted scalable video coding contents and encryption information metadata transmission block 111 and the encryption information metadata generation block 107.

In this case, the encryption information metadata generation block 107 generates encryption information metadata for the encrypted scalable video coding contents provided from the scalable video coding data encryption block 106, stores the encryption information metadata in the encryption information metadata archive 108, and inputs the encryption information metadata to the encrypted scalable video coding contents and encryption information metadata transmission block 111.

The encrypted scalable video coding contents and encryption information metadata transmission block 111 receives the encrypted scalable video coding contents from the scalable video coding data encryption block 106 and the generated encryption information metadata from the encryption information metadata generation block 107, and sends the same to the scalable video user terminal 200 via the network 300.

Meanwhile, referring to FIG. 5, the encrypted scalable video coding contents and encryption information metadata receiving block 201 in the scalable video user terminal 200 receives the encrypted scalable video coding contents and encryption information metadata via the network 300. In this case, the encrypted scalable video metadata parsing block 202 parses the encryption information metadata to obtain the encryption key and related encryption information and sends the same to the scalable encrypted video decryption block 203

The scalable encrypted video decryption block 203 decrypts the encrypted scalable video coding contents from the encrypted scalable video coding contents and encryption information metadata receiving block 201 using the encryption key and the related encryption information from the encrypted scalable video metadata parsing block 202, and provides the decrypted contents to the scalable video decoding block 204.

The scalable video decoding block 204 decodes the decrypted scalable video contents and provides the same to the scalable decoded video rendering block 205.

The scalable decoded video rendering block 205 renders the decoded scalable video contents and outputs the contents via the user interface 206 so that an output unit (not shown) reproduces the contents.

Figure 6:
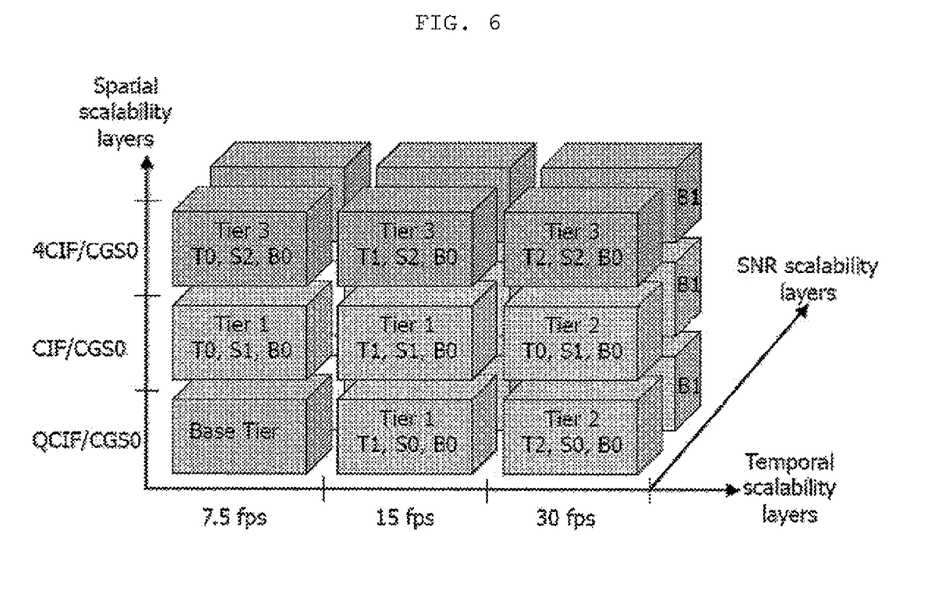
FIG. 6 illustrates an example of a layered scalable bit-stream representation structure of the present invention.

FIG. 6 illustrates an example of a layered scalable bit-stream representation structure of the present invention. A tier is a unit for tying one or more SVC bit-streams into one group. As shown in FIG. 6, a base tier ties base layer bit-streams. An example of a three-scalability level combination (a temporal scalability level, a spatial scalability level, and a coarse SNR scalability level), i.e., tier 1 (T0, S1, B0), (T1, S1, B0), (T1, S0, B0)), tier 2 {(T0, S1, B0), (T2, S0, B0)}, tier 3 ((T0, S2, B0), (T1, S2, B0), (T2, S2, B0)) is shown.

Here, when the base tier is protected (encrypted), Tier 1, Tier 2, and Tier 3, which depend on the base tier, cannot be recovered without decrypting the base tier, which protects all the tiers. If tier 1 {(T1, S1, B0)} is protected (encrypted), tier 3 {(T1, S2, B0), (T2, S2, B0)} and tier 2 {(T0, S1, B0)} which depend on tier 1 {(T1, S1, B0)} can be protected without being encrypted.

Figure 7:
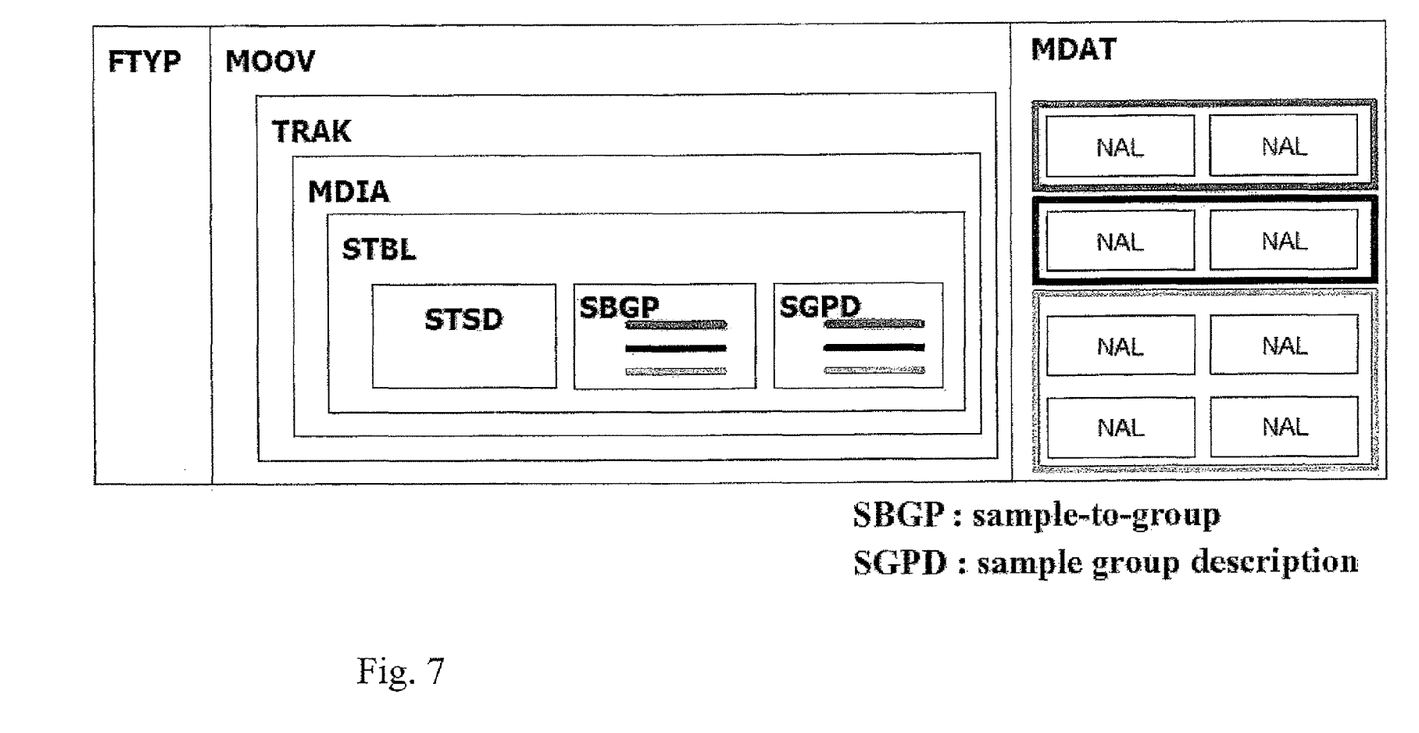
FIG. 7 illustrates a file format box structure for scalable bit-stream protection according to the present invention.

FIG. 7 illustrates a file format box structure for scalable bit-stream protection according to the present invention. The file format structure of FIG. 7 includes a file type box (FTYP), a moov box (MOOV), and an MDAT box (MDAT). The file type box (FTYP) indicates file type (e.g., an SVC type) information, the moov box (MOOV) includes video stream information (e.g., an SVC stream) information, and the MDAT box (MDAT) is defined as a box for storing actual data (e.g., an SVC stream). The moov box (MOOV) recursively includes a track box (TRAK), a MDIA box (MDIA), and a sample table box (STBL). The moov box (MOOV) has a Sample-to-Group (SBGP) box for designating a sample group in the sample table box (STBL), and a Sample Group Description (SGPD) box for recording sample group information.

Figure 8:
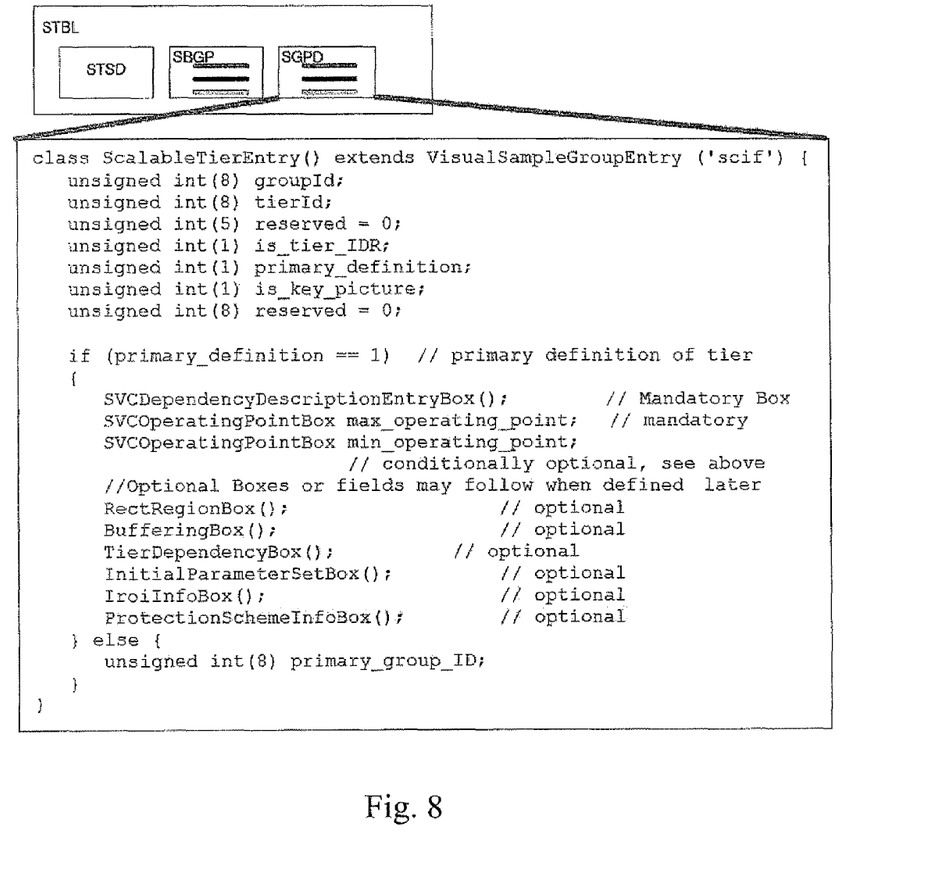
FIG. 8 illustrates a file format box structure for scalable bit-stream protection according to the present invention.

FIG. 8 illustrates a file format box structure, e.g., a Sample Group Description (SGPD) box structure of a sample table box (STBL) for scalable bit-stream protection according to the present invention. Here, the structure includes a ProtectionSchemeInfoBox( ) data structure for tier protection. The ProtectionSchemeInfoBox( ) data structure is as follows:

```
Aligned(8) class ProtectionSchemeInfoBox(fmt) extends Box
('sinf') {
    OrigianlFormatBox(fmt) original_format; // optional
    IPMPInfoBox IPMP_descriptors; // optional
    // IPMPInfoBox is used for MPEG-4 IPMP/IPMPX
```

```
    // For SVC layed protection, SchemeTypeBox and
SchemeInfomationBox is used.
    SchemeTypeBox       scheme_type_box; // optional
    SchemeInfomationBox info; // optional
}
```

Meanwhile, SVCOperatingPointBox indicates a dependence relationship between tiers by representing temporal, spatial, and SNR scalability information using temporal_level, dependency_id, and quality_level information in the respective tiers. A data structure of SVCOperatingPointBox is as follows:

```
class SVCOperatingPointBox extends Box ('svop') {
    unsigned int(2) reserved = 0;
    unsigned int(6) simple_priority_id;
    unsigned int(3) temporal_level;
    unsigned int(3) dependency_id;
    unsigned int(2) quality_level;
    unsigned int(2) progressive_refinement;
    unsigned int(2) discardable;
    unsigned int(4) reserved = 0;
}
```

Thus, the present invention allows for very effective layered dependence protection of the scalable video bit-stream using the layered dependence in the file format structure illustrated in FIGS. 7 and 8.

According to the present invention, the computational complexity of encryption and decryption can be reduced by encrypting only data of scalable video coding contents for each coding layer in terms of temporal, spatial, and SNR scalabilities, to provide a service for protected scalable video coding contents. And, contents can be protected by generating and distributing an encryption key for encryption and decryption depending on a class of a contents consumer. Thus, the encrypted compressed video contents can be decrypted with reduced computational complexity, and a conventional problem of increased inefficient computational complexity caused by encrypting all the data of all layers of the scalable video coding contents can be resolved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for protecting scalable video contents in a scalable video coding contents providing system that encrypts and provides scalable video contents requested by a scalable video user terminal, the method comprising:

receiving the requested scalable video contents;

storing the received scalable video contents in a scalable video contents archive and controlling to perform authentication and generate an encryption key to be sent to the user;

performing the authentication and generating the encryption key;

imaging a scalable video in response to the request and coding the imaged scalable video contents, the coded scalable video contents comprising a plurality of scalability layers;

encrypting only a portion of the plurality of scalability layers of the coded scalable video contents using the generated encryption key, resulting in encrypted scalable video coding contents, wherein the encrypting comprises selectively encrypting a disassembled low-pass filtered picture of the lowest layer or a high-pass filtered picture of an upper layer with respect to a temporally disassembled picture of an input video of a base layer;

generating encryption information metadata for the encrypted scalable video coding contents; and transmitting the encrypted scalable video coding contents and the generated encryption information metadata to the scalable video user terminal via a network or a storage medium.

2. The method of claim 1, wherein the encrypting comprises encrypting a base layer or an enhancement layer for coding data of a Fine Granular Scalability (FGS) layer coded to have Signal-to-Noise Ratio (SNR) scalability.

3. The method of claim 1, wherein the encryption information metadata comprises an encryption parameter and an encryption key.

4. A scalable video coding contents providing system for protecting scalable video contents requested by a scalable video user terminal, the system comprising at least one computer system, including at least one processor, the system further comprising:

a user contents request information receiving unit for receiving the requested scalable video contents;

a scalable video contents service control unit for storing the received scalable video contents in a scalable video contents archive and controlling to perform authentication and generate an encryption key to be sent to a user;

a user authenticating and encryption key control unit for performing the authentication and generating the encryption key;

an imaging unit for imaging a scalable video in response to the request;

a scalable video coding unit for coding the imaged scalable video contents, the coded scalable video contents comprising a plurality of scalability layers;

a scalable video coding data encryption unit for encrypting a portion of the plurality of scalability layers of the coded scalable video contents using the generated encryption key, such that at least a second portion of the plurality of scalability layers of the coded scalable video contents is not encrypted, resulting in encrypted scalable video coding contents, wherein the scalable video coding data encryption unit for encrypting the coded scalable video contents using the generated encryption key encrypts the coding data of temporal, spatial, and SNR scalability layers or encrypts a combination of the temporal, spatial, and SNR scalability layers;

an encryption information metadata generation unit for generating encryption information metadata for the encrypted scalable video coding contents; and an encrypted scalable video coding contents and encryption information metadata transmission unit for transmitting the encrypted scalable video coding contents and the generated encryption information metadata to the scalable video user terminal via a network.

5. The system of claim 1, wherein the scalable video coding data encryption unit selectively encrypts a disassembled low-pass filtered picture of the lowest layer or a high-pass filtered picture of an upper layer with respect to a temporally disassembled picture of an input video of a base layer.

6. The system of claim 4, wherein the scalable video coding data encryption unit encrypts a base layer or an enhancement layer for coding data of an FGS layer coded to have SNR scalability.

7. The system of claim 4, wherein the encryption information metadata comprises an encryption parameter and an encryption key.

8. A scalable video user terminal for protecting encrypted scalable video coding contents and encryption information metadata by decrypting and decoding the same, the terminal comprising:

at least one computer system including at least one processor;

an encrypted scalable video metadata parsing unit for parsing received encryption information metadata to obtain an encryption key and encryption information;

a scalable encrypted video decryption unit for decrypting an encrypted portion of received encrypted scalable video coding contents using the encryption key and encryption information, wherein the scalable encrypted video decryption unit decrypts temporal, spatial, and SNR scalability layers or decrypts a combination of the temporal, spatial, and SNR scalability layers, and wherein the encrypted scalable video coding contents comprises the encrypted portion and an unencrypted portion;

a scalable video decoding unit for decoding the decrypted scalable video contents; and a scalable decoded video rendering unit for rendering and reproducing the decoded scalable video contents.

9. The terminal of claim 8, wherein the encryption information metadata comprises an encryption parameter and an encryption key.

10. The terminal of claim 8, wherein the scalable encrypted video decryption unit acquires, installs, and uses a decryption tool through a storage medium or a network when there is no decryption tool in decrypting the received encrypted scalable video coding contents.

11. The terminal of claim 8, wherein the scalable encrypted video decryption unit requests the encryption metadata for decryption via a storage medium or a network, receives and acquires the encryption metadata in response to the request, and uses the encryption metadata in decrypting the received encrypted scalable video coding data when there is no encryption metadata for decryption in decrypting the received encrypted scalable video coding contents.

12. An apparatus for protecting scalable video coding contents, the apparatus comprising at least one computer system including at least one processor, the apparatus further comprising:

an input unit for dividing and inputting input video data acquired in response to a request from a video user terminal into at least one of temporal, spatial, and SNR scalability layers;

a coding unit for coding the input video data of at least one of the temporal, spatial, and SNR scalability layers;

an encryption unit for encrypting only a portion of video data of the coded temporal, spatial, and SNR scalability layers, wherein the encryption unit selectively encrypts a disassembled low-pass filtered picture of the lowest layer or a high-pass filtered picture of an upper layer with respect to a temporally disassembled picture of an input video of a base layer;

a generation unit for generating metadata for the video data of the encrypted temporal, spatial, and SNR scalability layers; and a storage unit for combining and storing the encrypted coding data of the temporal, spatial, and SNR scalability layers and the generated metadata.

13. The apparatus of claim 12, wherein the encryption unit encrypts a base layer or an enhancement layer for coding data of an FGS layer coded to have SNR scalability.

14. The apparatus of claim 12, wherein the metadata comprises an encryption parameter and an encryption key.

15. The apparatus of claim 12, wherein the encryption unit for encrypting video data of the coded temporal, spatial, and SNR scalability layers encrypts each of coding data of temporal, spatial, and SNR scalability layers or any combination of the temporal, spatial, and SNR scalability layers.

16. A method for protecting scalable video coding contents, the method comprising:
    dividing and inputting input video data acquired in response to a request from a video user terminal into at least one of temporal, spatial, and SNR scalability layers;
    coding the input video data of the at least one of the temporal, spatial, and SNR scalability layers;
    encrypting the video data of the coded temporal, spatial, and SNR scalability layers, wherein the encrypting of the video data of the coded temporal, spatial, and SNR scalability layers comprises encrypting each of the coding data of the temporal, spatial, and SNR scalability layers or any combination of the temporal, spatial, and SNR scalability layers;
    generating metadata for the video data of the encrypted temporal, spatial, and SNR scalability layers; and
    combining and storing the encrypted coding data of the temporal, spatial, and SNR scalability layers and the generated metadata.

17. A method for protecting scalable video coding contents, the method comprising:
    dividing input video data into at least one of temporal, spatial, and SNR scalability layers;
    coding the input video data of the at least one of the temporal, spatial, and SNR scalability layers;
    grouping bit-streams for the input video data of the coded temporal, spatial, and SNR scalability layers as a combination of the at least one temporal, spatial, and SNR scalability layers to form tiers;
    encrypting one or more of the formed tiers, wherein the encrypting of the one or more of the formed tiers comprises encrypting each of the coded temporal, spatial, and SNR scalability layers or any combination of the temporal, spatial, and SNR scalability layers; and
    generating encryption information for the encrypted tiers as metadata.

18. The method of claim 17, further comprising combining the encrypted tiers or original tiers and the metadata for tier protection and storing the result as one file or as separate data.

19. The method of claim 17, wherein the encrypting of one or more of the formed tiers comprises either protecting all the tiers or selectively encrypting bit-stream data corresponding to a specified scalability combination in the tier.

20. A non-transitory computer-readable recording medium having a program stored therein for executing a method for protecting scalable video coding contents according to claim 1.

21. A non-transitory computer-readable recording medium having a program stored therein for executing a method for protecting scalable video coding contents according to claim 16.

22. A non-transitory computer-readable recording medium having a program stored therein for executing a method for protecting scalable video coding contents according to claim 16.

* * * * *

UNITED STATES PATENT AND TRADEMARK OFFICE
CERTIFICATE OF CORRECTION

| | |
|---|---|
| PATENT NO. | : 8,509,434 B2 |
| APPLICATION NO. | : 12/142934 |
| DATED | : August 13, 2013 |
| INVENTOR(S) | : Keun Soo Park et al. |

It is certified that error appears in the above-identified patent and that said Letters Patent is hereby corrected as shown below:

In the Claims

Column 9, Line 63, Claim 5, delete "claim 1" and insert -- claim 4 --

Column 12, Lines 33-34, Claim 22, delete "claim 16" and insert -- claim 17 --

Signed and Sealed this
Eleventh Day of February, 2014

Michelle K. Lee
*Deputy Director of the United States Patent and Trademark Office*